United States Patent
Kawai et al.

(10) Patent No.: US 7,344,342 B2
(45) Date of Patent: Mar. 18, 2008

(54) MACHINING APPARATUS

(75) Inventors: Tomohiko Kawai, Yamanashi (JP); Kenzo Ebihara, Yamanashi (JP); Takayuki Oda, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 11/736,934

(22) Filed: Apr. 18, 2007

(65) Prior Publication Data

US 2007/0248430 A1    Oct. 25, 2007

(30) Foreign Application Priority Data

Apr. 19, 2006   (JP) ............................. 2006-115703
Nov. 6, 2006    (JP) ............................. 2006-300656

(51) Int. Cl.
*B23Q 15/007*   (2006.01)

(52) U.S. Cl. ............... 409/289; 409/326; 409/327; 82/904; 700/159; 700/186

(58) Field of Classification Search ............ 409/289, 409/288, 317, 320, 321, 325, 326, 327; 82/904, 82/1.5, 1.2, 12; 408/17; 700/159, 186
See application file for complete search history.

(56) References Cited

U.S. PATENT DOCUMENTS

| | | | | |
|---|---|---|---|---|
| 2,210,923 A | * | 8/1940 | Jacquerod et al. ....... | 101/401.1 |
| 5,609,448 A | * | 3/1997 | Oohara et al. ............ | 409/80 |
| 5,911,802 A | * | 6/1999 | Kimura et al. ........... | 82/1.11 |
| 6,099,134 A | | 8/2000 | Taniguchi et al. | |

| | | | | |
|---|---|---|---|---|
| 2005/0203660 A1 | * | 9/2005 | Kawai et al. ............ | 700/163 |
| 2007/0086869 A1 | * | 4/2007 | Kawai et al. ............ | 409/188 |

FOREIGN PATENT DOCUMENTS

| | | | |
|---|---|---|---|
| JP | 10-029366 A | * | 2/1998 |
| JP | 3402138 B2 | | 2/2003 |
| JP | 2005-67065 A | | 3/2005 |
| WO | 0048037 A2 | | 8/2000 |

OTHER PUBLICATIONS

EP Search Report dated Jul. 20, 2007 for EP 07 00 742.1.

* cited by examiner

*Primary Examiner*—Erica Cadugan
(74) *Attorney, Agent, or Firm*—Lowe, Hauptman, Ham & Berner, LLP

(57) ABSTRACT

A machining apparatus capable of irregularly forming a plurality of dimples on a surface of a workpiece in a short period of time. The machining apparatus includes a tool for machining a plurality of dimples on a surface of a workpiece, each dimple having a depth in a first direction; a drive unit for displacing the tool relative to the workpiece in the first direction and a second direction generally perpendicular to the first direction; a controller for controlling the drive unit so as to displace the tool relative to the workpiece in the first direction such that the tool cuts into or leaves the workpiece, while the tool is being moved relative to the workpiece in the second direction, wherein a trigger of the displacement of the tool in the first direction is timing calculated by using a second waveform, the second waveform being determined by comparing the magnitude of a first waveform with a predetermined threshold, at least one of frequency and amplitude of the first waveform being irregular.

12 Claims, 9 Drawing Sheets

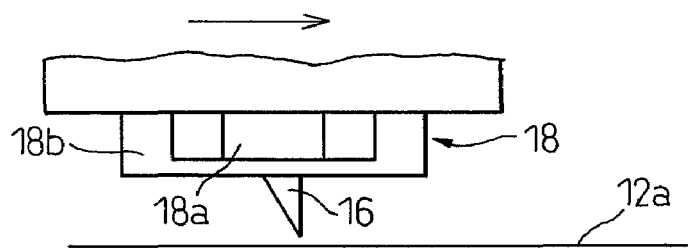
Fig. 3a
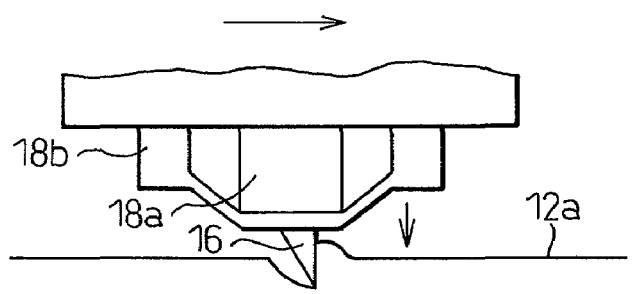
Fig. 3b
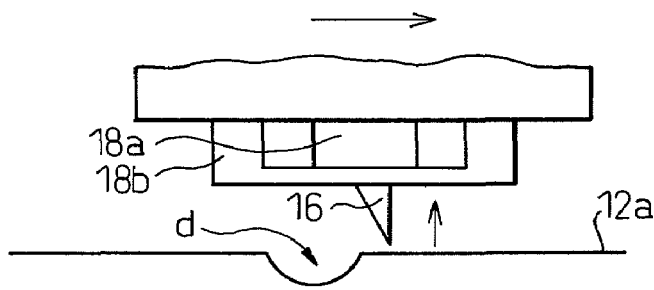
Fig. 3c
Fig. 4
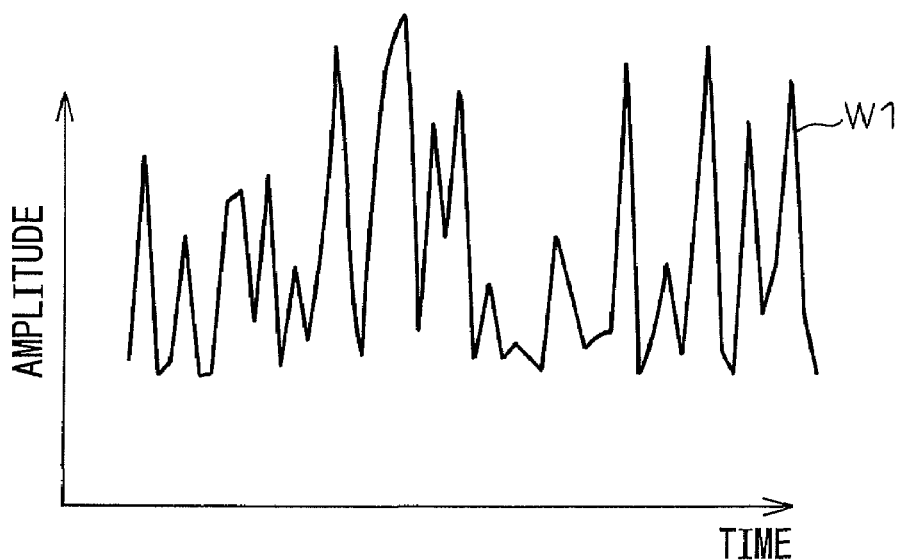

MACHINING APPARATUS

RELATED APPLICATIONS

The present application claims priority from Japanese Patent Application Nos. 2006-115703 and 2006-300656, filed on Apr. 19 and Nov. 6, 2006, the entire contents of which are fully incorporated herein by reference.

BACKGROUND OF THE INVENTION

1. Field of the Invention

The present invention relates to a machining apparatus for forming a plurality of dimples on a surface of a workpiece, in particular a machining apparatus for rapidly forming a large number of dimples, in an irregular pattern, on a surface of a mold for molding a light guide plate.

2. Description of the Related Art

In many cases, a light guide pipe made of translucent resin or the like, provided with a side light or a back light, is used as an illumination device for a liquid crystal display (LCD) used in a personal computer or a mobile-phone. As the LCD is required to have a uniform surface brightness, a large number of minimal protrusions (or dots), each having a hemispheroidal shape or a prism shape, are formed on the surface of the light guide pipe so as to emit scattered light from the light guide pipe. To this end, a large number of cavities (or dimples) are formed on a mold for molding the light guide pipe, by using a machining apparatus provided with a tool a tip of which has a pyramid shape or a cone shape. Such an apparatus is described in Japanese Unexamined Patent Publication No. 2005-67065, for example.

In general, when the dots are regularly arranged on the light guide pipe, a moire image may be generated on the display of the LCD due to interference with a color filter or the like. Therefore, the dots should be irregularly arranged and the dimples of the mold, corresponding to the dots of the light guide pipe, should also be irregularly arranged on the mold. In a machining apparatus of the prior art, the position or the coordinate of each dimple on the mold is appointed, one by one, in a machining program. In addition, Japanese Patent Publication No. 3402138 discloses a technique for irregularly arranging a plurality of dots, in which the coordinate of each dot is determined by using a mathematical function satisfying a certain constraint condition.

In general, the length of the diameter or one side of each dimple is approximately 10 μm. In some cases, the number of such dimples formed on the mold or the workpiece can amount to several tens or hundreds of thousands. In order to appoint all coordinates of such a large number of dimples in the machining program, the program must include tens or hundreds of thousands of lines even if only one line is required in the program for machining one dimple. On the other hand, when a particular mathematical function as shown in Japanese Patent Publication No. 3402138 is used, the coordinate of each dimple may be effectively determined. However, in view of the movement and the positioning of the tool or the workpiece, it takes time to form each dimple, because it is necessary to precisely form each dimple at the determined coordinate. When tens or hundreds of thousands of dimples must be formed, one day or more is necessary, even if only one second is required to form one dimple. Therefore, this technique is unsuitable for high-speed machining.

SUMMARY OF THE INVENTION

Accordingly, it is an object of the present invention to provide a machining apparatus capable of irregularly forming a large number of dimples in a short period of time.

To this end, according to the present invention, there is provided a machining apparatus comprising: a tool for machining a plurality of dimples on a surface of a workpiece, each dimple having a depth in a first direction; a drive unit for displacing the tool relative to the workpiece in the first direction and a second direction generally perpendicular to the first direction; a controller for controlling the drive unit so as to displace the tool relative to the workpiece in the first direction such that the tool cuts into or leaves the workpiece, while the tool is being moved relative to the workpiece in the second direction, wherein the timing of a trigger of the displacement of the tool relative to the workpiece in the first direction is calculated by using a second waveform, the second waveform being determined by comparing the magnitude of a first waveform with a predetermined threshold, at least one of frequency and amplitude of the first waveform being irregular.

The drive unit may be configured to move the tool relative to the workpiece in a third direction generally perpendicular to both the first and second directions.

The first waveform may be a white noise waveform. In this case, the trigger is timed corresponding to at least one of a rising edge and a trailing edge of the second waveform.

The area density of the plurality of dimples formed on the workpiece may be varied by changing the predetermined threshold.

The first waveform may be configured by superposing a white noise waveform on a periodic waveform. In this case, the trigger is timed when the magnitude correlation between the predetermined threshold and magnitude of the first waveform is reversed in each period of the periodic waveform.

One preferable example of the periodic waveform is a saw-tooth waveform.

The degree of irregularity of the positions of the plurality of dimples formed on the workpiece may be varied by changing the amplitude of the white noise waveform.

The drive unit may have a piezoelectric element for displacing the tool relative to the workpiece in the first direction.

The drive unit may be configured to generate microdisplacement of the workpiece relative to the tool in the third direction, while the tool is being moved relative to the workpiece in the second direction, the amount of microdisplacement of the workpiece in the third direction being proportional to the magnitude of a third waveform, at least one of frequency and amplitude of the third waveform being irregular.

In this case, the drive unit is preferably configured not to generate microdisplacement of the workpiece relative to the tool in the third direction, while the tool is cutting into the workpiece.

One example of the third waveform is a white noise waveform.

The drive unit may have a piezoelectric element for displacing the workpiece relative to the tool in the third direction. In this case, the piezoelectric element is activated by means of voltage having the third waveform applied to the piezoelectric element.

BRIEF DESCRIPTION OF THE DRAWINGS

The above and other objects, features and advantages of the present invention will be made more apparent by the following description, of the preferred embodiments thereof, with reference to the accompanying drawings wherein:

FIGS. 3a to 3c show the states before, during and after forming a dimple on a surface of a workpiece by means of a tool, respectively;

FIG. 4 is a graph showing an example of a white noise waveform used in the machining apparatus of the invention;

FIG. 11b is a graph showing a white noise waveform superposed on the waveform of FIG. 11a;

DETAILED DESCRIPTIONS

Figure 1:
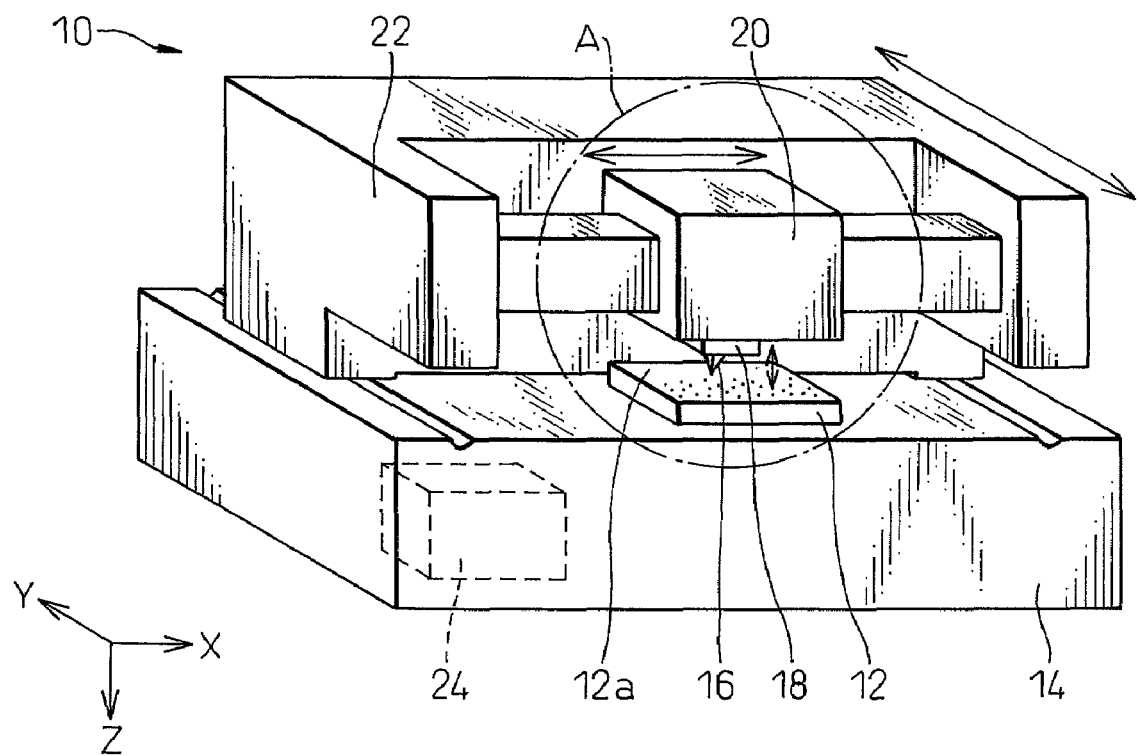
FIG. 1 shows a schematic configuration of a machining apparatus of a first embodiment according to the invention.
Figure 2:
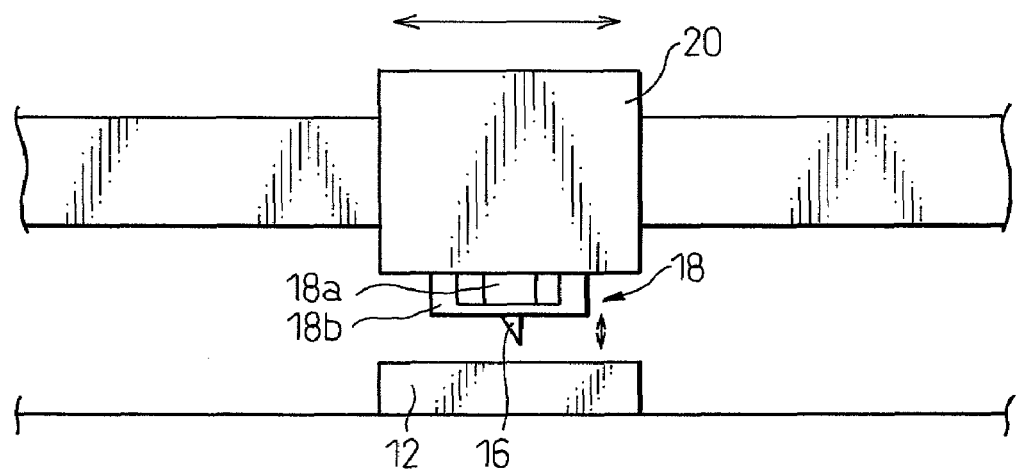
FIG. 2 is an enlarged view of "A" portion of FIG. 1.

The present invention will be described below with reference to the drawings. FIG. 1 shows a schematic configuration of a machining apparatus 10 of a first embodiment according to the invention. The machining apparatus 10 has a fixed part or a base part 14, on which a workpiece 12 such as an injection mold can be loaded. A tool 16 is held by a first linear moving part 18 capable of linearly moving in a first direction (or a Z-direction in FIG. 1) generally perpendicular to a surface 12a of the workpiece 12. A preferable example of the first moving part 18 has, as shown in FIG. 2, a piezoelectric element 18a mounted to the tool 16, configured to be expanded or contracted in the Z-direction, and an elastic member 18b, such as a plate spring, for biasing the tool 16 toward the initial position thereof.

The first moving part 18 is held by a second linear moving part 20 capable of linearly moving in a second direction (or an X-direction in FIG. 1) perpendicular to the first direction. The second moving part 20 is held by a third linear moving part 22 capable of linearly moving in a third direction (or a Y-direction in FIG. 1) perpendicular to both of the first and second direction. In the first embodiment, the first, second and third moving part 18, 20 and 22 together constitute a drive unit for the tool 16. Therefore, the tool 16 may form a dimple having an arbitrary depth at an arbitrary position on the surface 12a of the workpiece 12.

Each linear moving part is controlled by a controller 24 contained in or externally connected to the machining apparatus 10. First, while the second moving part 20 is moved at a predetermined speed (preferably a constant speed) in the second direction from one end to the other end of the workpiece 12 to be machined, the first moving part 18 is intermittently displaced in the Z-direction, so as to form dimples on the surface 12a of the workpiece 12. In other words, the tool 16 repeats a motion in which the tool 16 is lowered in the Z-direction at a certain time and cuts into the workpiece, while the tool is moved in the X-direction, and the tool is raised in the Z-direction immediately after forming a dimple on the workpiece surface 12a. Otherwise, the movement of the tool 16 in the X-direction may be stopped while the tool is displaced in the Z-direction.

FIGS. 3a to 3c show the detail of the motion of the tool forming a dimple on the workpiece surface 12a. From the state as shown in FIG. 3a, in which the tool 16 is moved in the X-direction at a constant speed, the piezoelectric element 18a is expanded at a certain time such that the tool 16 may cut into the workpiece 12 in a predetermined depth, as shown in FIG. 2b. Then, as shown in FIG. 3c, the piezoelectric element 18a is contracted to the initial state so as to retract the tool 16. Due to a series of movements, a dimple "d" may be formed on the workpiece surface. In general, the series of movements are repeated more than one time while the second moving part 20 is moved from one end to the other end of the workpiece surface 12a. Hereinafter, the distance or the time of the movement of the second moving part 20 from one end to the other end of the workpiece surface 12a is referred as "one span".

After the motion of "one span" is completed, the third linear moving part 22 displaces the second moving part 20 in the Y-direction by a predetermined distance (i.e., a distance corresponding to from 1.5 to 5 times of an average diameter of the dimples or the length of one side of each dimple). Then, the motion of one span of the second moving part 20 is carried out again. By repeating these movements, dimples may be formed on the entire surface of the workpiece.

In order to irregularly arrange the dimples on the workpiece surface 12a, the controller 24 generates an activating command for the first linear moving part 18, using a second waveform obtained by comparing the magnitude of a first signal or waveform with a predetermined threshold. At this point, at least one of frequency and amplitude of the first waveform is irregular. The first waveform can be any waveform as long as at least one of frequency and amplitude of the first waveform is irregular. A preferable example of the first waveform is a white noise waveform as shown in FIG. 4. In general, the white noise has the same strength at any frequency and may be generated by using normal random numbers. The white noise may be generated by the controller 24 or transmitted from another device to the controller 24. By using such a white noise, a waveform having irregular frequency and/or amplitude may be easily obtained. In addition, the above procedure regarding comparison may be performed by the controller or another suitable comparator.

Figure 5:
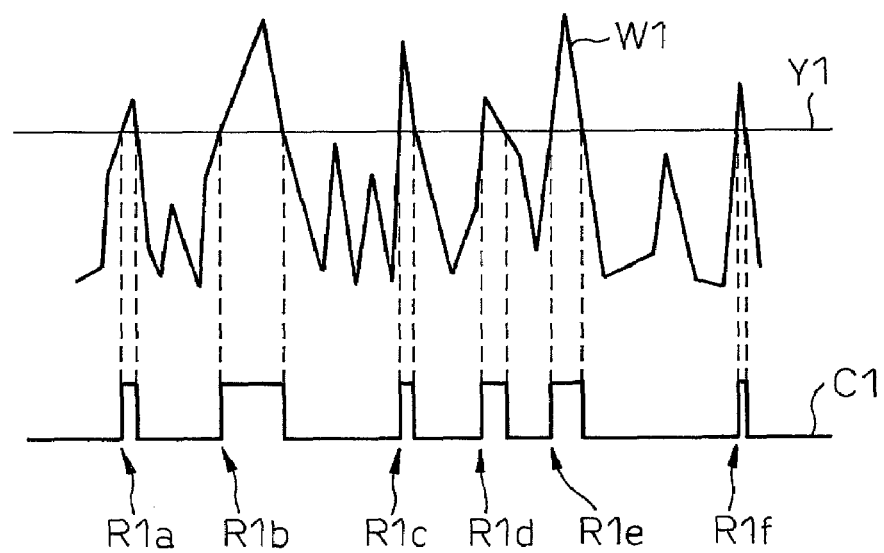
FIG. 5 is a graph showing a rectangular waveform obtained by comparing the white noise waveform with a certain threshold.
Figure 6:
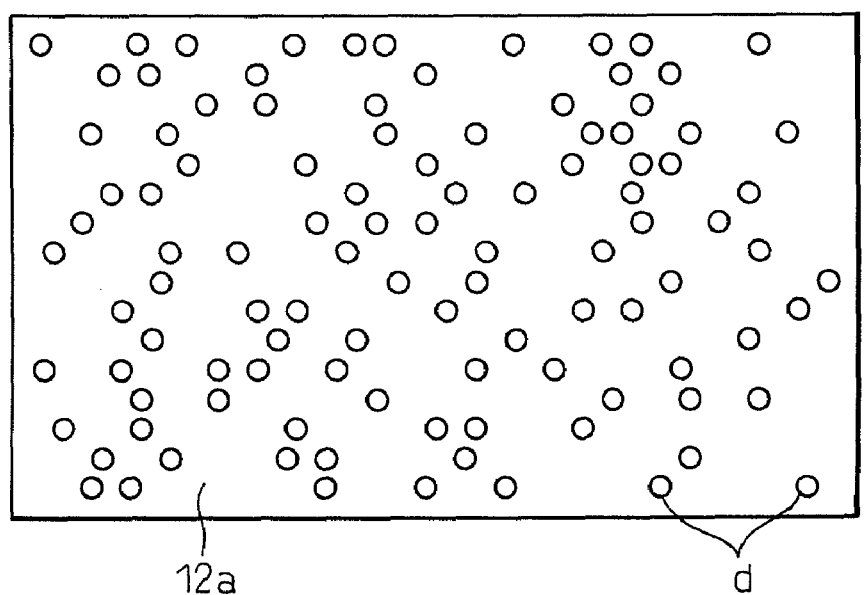
FIG. 6 is a diagram showing an example of an array of dimples formed on the workpiece by means of the machining apparatus of the invention.

FIG. 5 explains when the displacement of the tool 16 by the first moving part 18 (i.e., the formation of each dimple) should be performed. As shown, the first waveform or the white noise waveform W1 is compared with suitable amplitude or a threshold Y1 so as to obtain a second stepwise waveform or a rectangular waveform C1. A method for the comparison itself may be the same as a conventional method. Next, a command for displacing the first linear moving part 18 or forming each dimple is generated by using each rising edge R1$a$ to R1$f$ of the waveform C1 as a trigger. In other words, the white noise waveform W1 as shown in FIG. 4 corresponds to at least a part of one span of the second moving part 20, and each rising edge of the waveform C1 after the comparison corresponds to the timing or the position of each dimple formed on the workpiece during one span. Obviously, the rising edges R1$a$ to R1$f$ of the waveform C1 are generated at irregular intervals. Therefore, by using these rising edges as triggers, dimples are also positioned at irregular intervals on the workpiece surface. By repeating such a motion of one span while feeding the workpiece 12 in the Y-direction, a large number of dimples "d" may be irregularly formed on the workpiece surface 12$a$, as shown in FIG. 6.

In the above operation, it is not necessary to determine or calculate each coordinate of the large number of dimples. Therefore, time required for forming each dimple may be greatly reduced, resulting in that the time for machining the whole workpiece may also be remarkably reduced. In addition, the rising edge of the rectangular waveform is used as the trigger. However, only the trailing edge, both of the rising and trailing edges, or various timing calculated by using the edges (for example, the middle point between the rising and trailing edges) may be used as the trigger.

Figure 7:
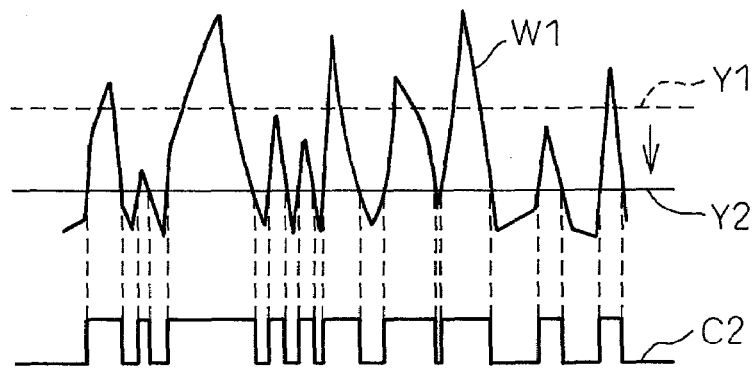
FIG. 7 is a graph showing a waveform obtained by comparing the white noise waveform with a threshold lower than the threshold of FIG. 5.

Using the waveform obtained by comparing the white noise with the threshold has a remarkable effect in that the area density of the dimples may be easily varied, as well as the dimples being irregularly and rapidly formed without setting the coordinates of the dimples. For example, as shown in FIG. 7, the threshold Y1, used when comparing the white noise waveform W1, may be changed to a threshold Y2 smaller than the threshold Y1, whereby a second rectangular waveform C2, having more rising edges (ten in this case) than the case of FIG. 5, may be obtained. Accordingly, the number of dimples formed in one span may increase, resulting in an increase of the area density of the dimples.

Figure 8:
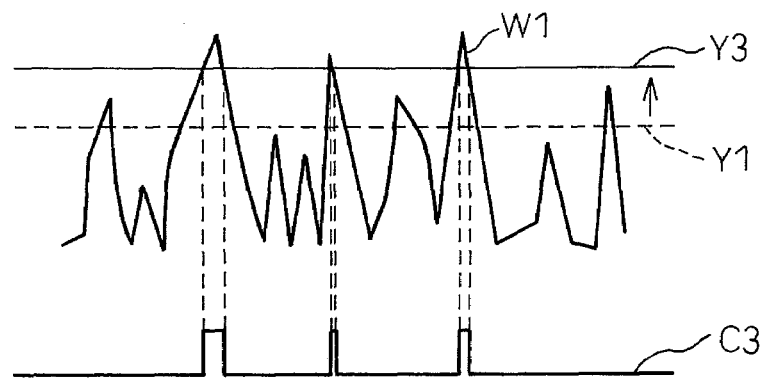
FIG. 8 is a graph showing a waveform obtained by comparing the white noise waveform with a threshold higher than the threshold of FIG. 5.

In contrast, as shown in FIG. 8, the threshold Y1 may be changed to a threshold Y3 larger than the threshold Y1, whereby a third rectangular waveform C3, having less rising edges (three in this case) than the case of FIG. 5, may be obtained. Accordingly, the number of dimples formed in one span may decrease, resulting in a decrease of the area density of the dimples.

Figure 9:
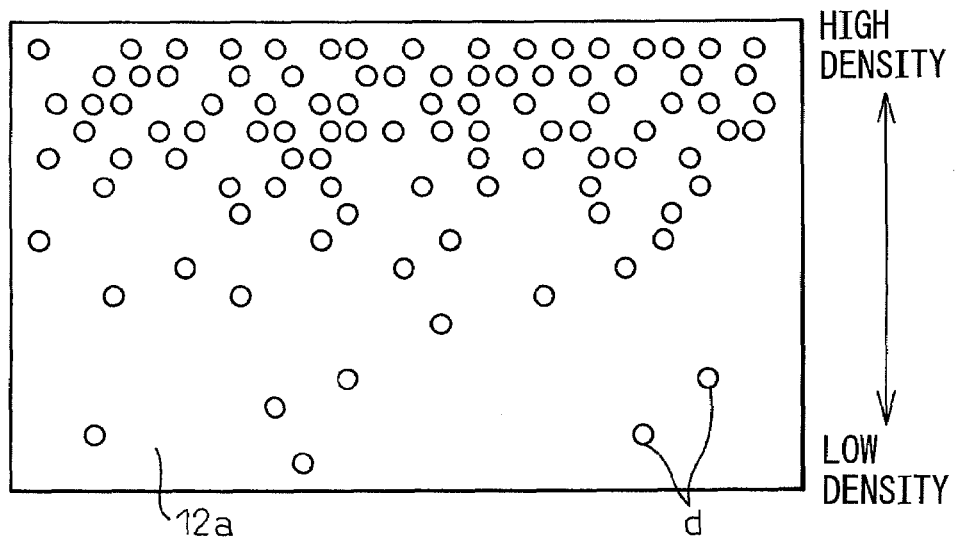
FIG. 9 is a diagram showing a modification of the array of dimples formed on the workpiece by means of the machining apparatus of the invention.

FIG. 9 shows a modification in which the area density of the dimples varies in the surface 12$a$ of one workpiece 12, by utilizing the comparisons explained with reference to FIGS. 5, 7 and 8. In FIG. 9, the threshold used in the comparison process gradually increases toward the bottom, such that the number of the triggers and thus the area density of the dimples gradually decreases. In this way, the area density of the dimples may be arbitrarily varied by a simple process that involves changing the magnitude of the threshold. Obviously, the area density of the dimples may be varied in one workpiece (FIG. 9) or every workpiece.

Figure 10:
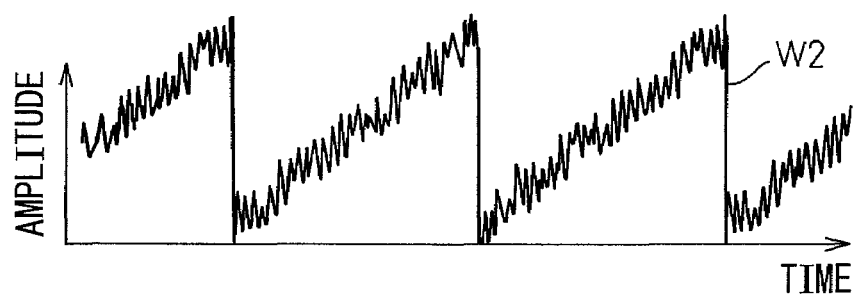
FIG. 10 is a graph showing an alternative of the waveform of FIG. 4.
Figure 11A:
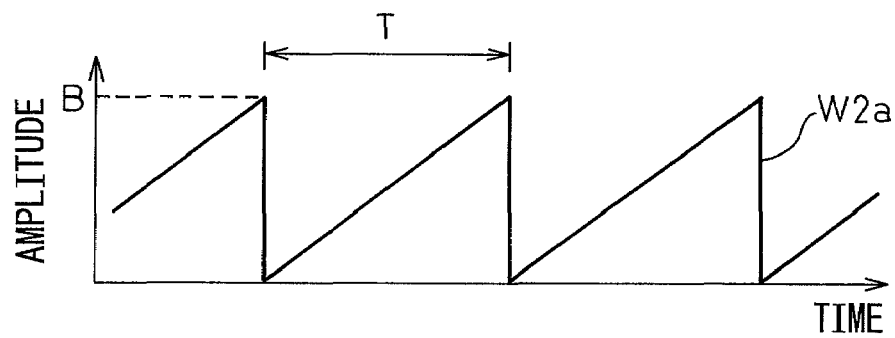
FIG. 11a is a graph showing a saw-tooth waveform used to obtain the waveform of FIG. 10.
Figure 11B:

FIG. 10 shows a waveform W2, as an alternative of the waveform of FIG. 4, which may be used in the machining apparatus of the invention as the first waveform. As shown in FIGS. 11$a$ and 11$b$, the first waveform W2 is constituted by superposing a white noise waveform W2$b$ on a waveform W2$a$ having generally constant cycle T and amplitude B. As shown in FIG. 11$b$, the mean cycle and the maximum amplitude of the waveform W2$b$ are smaller than the cycle T and the amplitude B of the waveform W2$a$.

Figure 12:
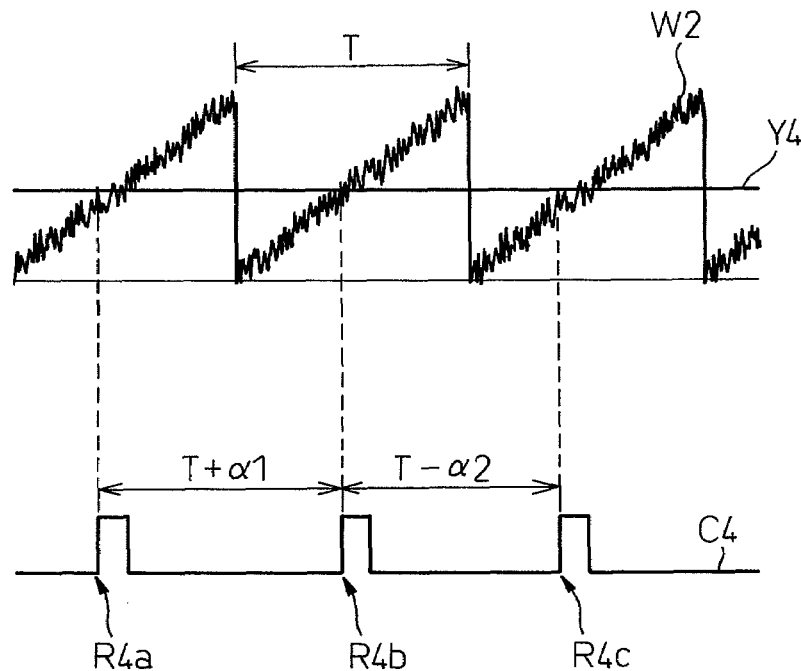
FIG. 12 is a graph showing a rectangular waveform obtained by comparing the waveform of FIG. 10 with a certain threshold.
Figure 13:
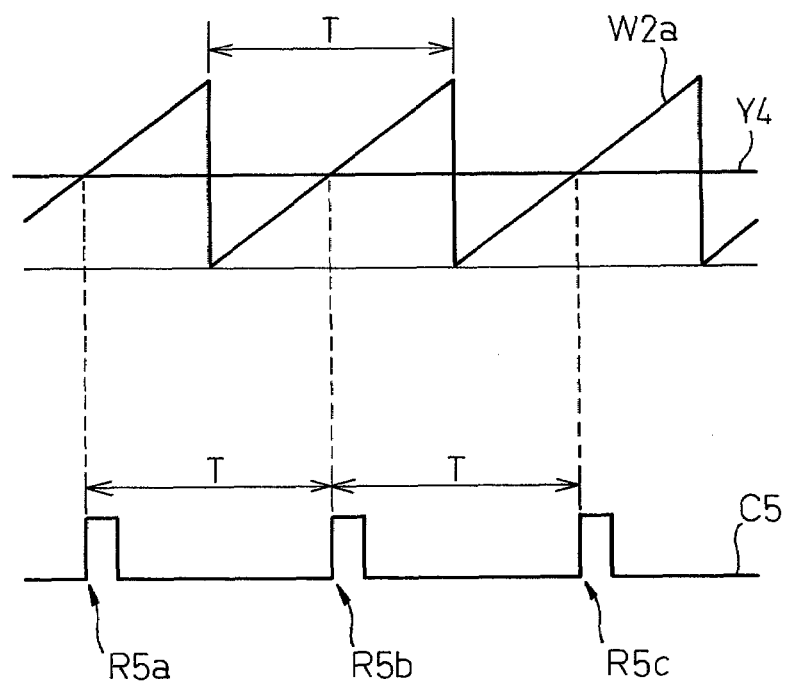
FIG. 13 is a graph, in contrast to FIG. 12, showing a rectangular waveform obtained by comparing a waveform, which is not superposed on a white noise, with a certain threshold.

FIG. 12 is a diagram explaining that the dimples may be irregularly arranged by using the waveform W2 as shown in FIG. 10, and FIG. 13 shows a comparative example used as a reference. In the comparison process performed in FIG. 12 or 13, a step of a rectangular waveform is generated only when the magnitude of a saw tooth waveform first exceeds a predetermined threshold in each period (or when the magnitude correlation between the threshold and the magnitude of the waveform is reversed). In other words, only one step is generated in the rectangular waveform in each period. At this point, when the saw-tooth waveform W2$a$, on which the white noise is not superposed, is compared with a certain threshold Y4, as shown in FIG. 13, intervals of rising edges R5$a$, R5$b$, R5$c$ . . . of an obtained rectangular waveform C5 are all equal to a cycle T of the waveform W2$a$. Therefore, the dimples, formed by using the rising edges as triggers, are regularly arranged.

On the other hand, when the saw-tooth waveform W2$a$, on which the white noise W2$b$ is superposed, is compared with the threshold Y4, as shown in FIG. 12, intervals of rising edges R4$a$, R4$b$, R4$c$ . . . in one span of an obtained rectangular waveform C4 are not equal to each other (for example, a first interval is T+$\alpha$1, a second interval is T−$\alpha$2 . . . (where an is a positive number). Therefore, the dimples, formed by using the rising edges as triggers, are irregularly arranged. When the saw-tooth waveform on which the white noise is superposed is used, one dimple is formed in one period of the saw-tooth waveform. Therefore, this way is suitable when the dimples should be irregularly arranged and the total number of the dimples is predetermined.

Figure 14:
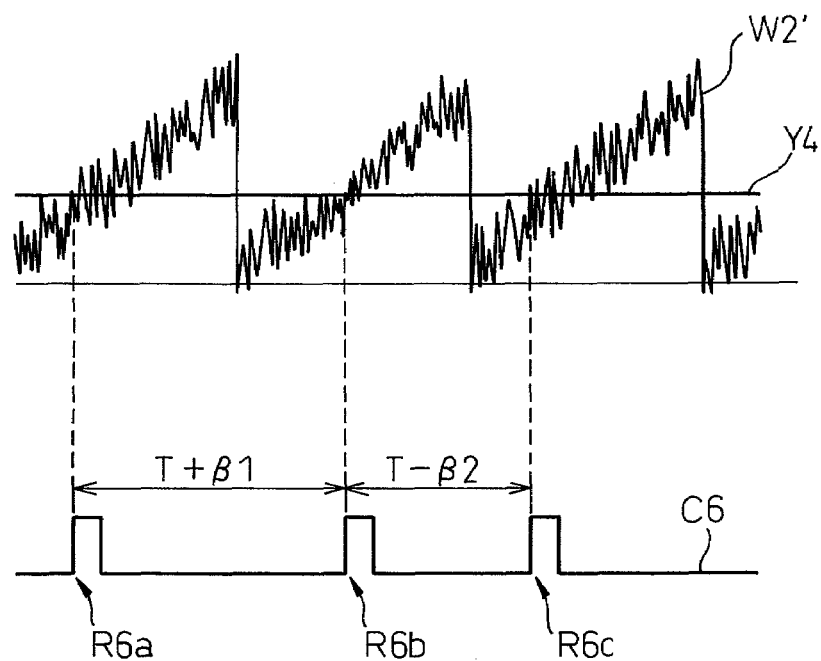
FIG. 14 is a graph in case that the amplitude of the white noise is larger than that of FIG. 12.

In addition, when the saw-tooth waveform on which the white noise is superposed is used, the degree of irregularity of the positions of the plurality of dimples is varied by changing the amplitude of the white noise waveform. For example, as shown in FIG. 14, by superposing white noise, having the mean amplitude larger than that of the white noise W2$b$ of FIG. 12, on the saw-tooth waveform W2$a$, a waveform W2' is obtained. When the waveform W2' is used as the first waveform, the dispersion of timing, when the magnitude correlation between the threshold Y4 and the magnitude of the waveform W2' is reversed in each period, becomes larger than that of FIG. 12. Therefore, in the second waveform or a rectangular waveform C6 obtained by comparing the first waveform with the threshold, the dispersion of intervals between each rising edge of the second waveform becomes larger than that of the rectangular waveform C4 of FIG. 12. In other words, intervals of rising edges R6a, R6b, R6c . . . in one span of the rectangular waveform C6 are not equal to each other (for example, a first interval is T+β1, a second interval is T−β2 . . . (where βn is a positive number). Further, the average of βn is larger than the average of the above αn. In this case, therefore, the degree of irregularity of the positions of the formed dimples is larger than that of FIG. 12.

Figure 15:
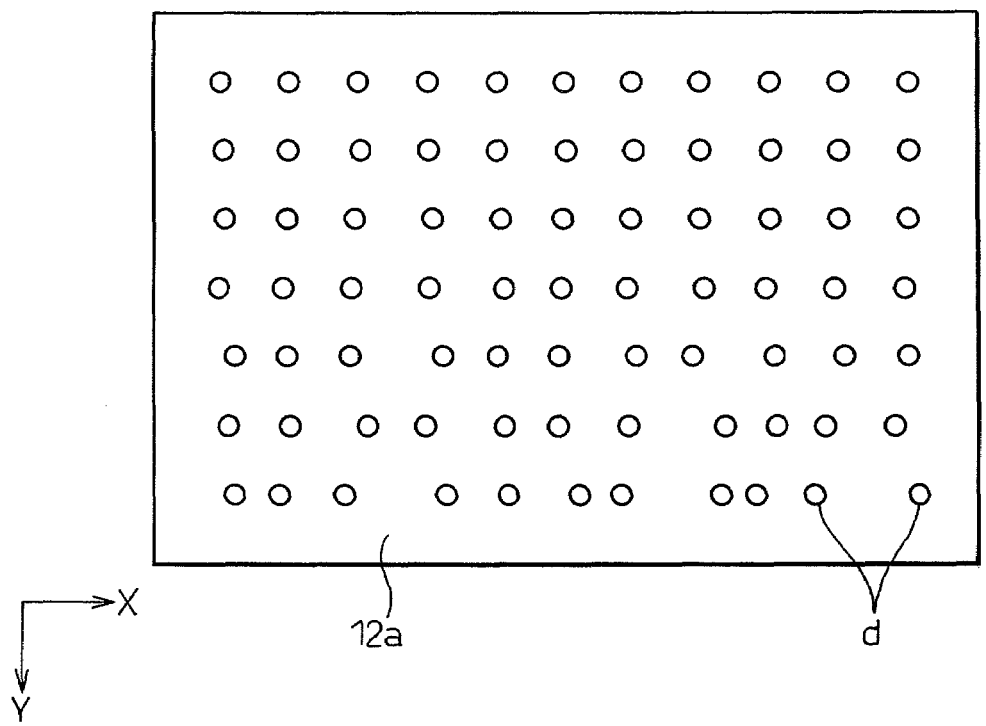
FIG. 15 is a diagram showing another modification of the array of dimples formed on the workpiece by means of the machining apparatus of the invention.

FIG. 15 shows an example modified by utilizing the concept as shown in FIGS. 10 to 14, in which the area density of the dimples d is varied in one workpiece surface 12a. In the example of FIG. 15, the amplitude of the white noise superposed on the same saw-tooth waveform is gradually increases toward the bottom of the drawing (or in the Y-direction). Therefore, nearer the bottom, dimples are more irregularly arranged because the intervals of the rising edges becomes more irregular. In this way, by a simple process of changing the amplitude of the waveform, the degree of the irregularity of the dimples may be varied without changing the total number of dimples. It is obvious that the degree of the irregularity if the dimples may be varied in one workpiece surface (FIG. 15) or every workpiece.

In the first embodiment as explained above, the dimples may be irregularly arranged in the second direction (or the X-direction). However, as the workpiece is fed by a constant distance in the third direction (or the Y-direction) in each span, the dimples are not irregularly arranged in the third direction. Hereinafter, a second embodiment is described, in which the dimples may also be irregularly arranged in the Y-direction.

Figure 16:
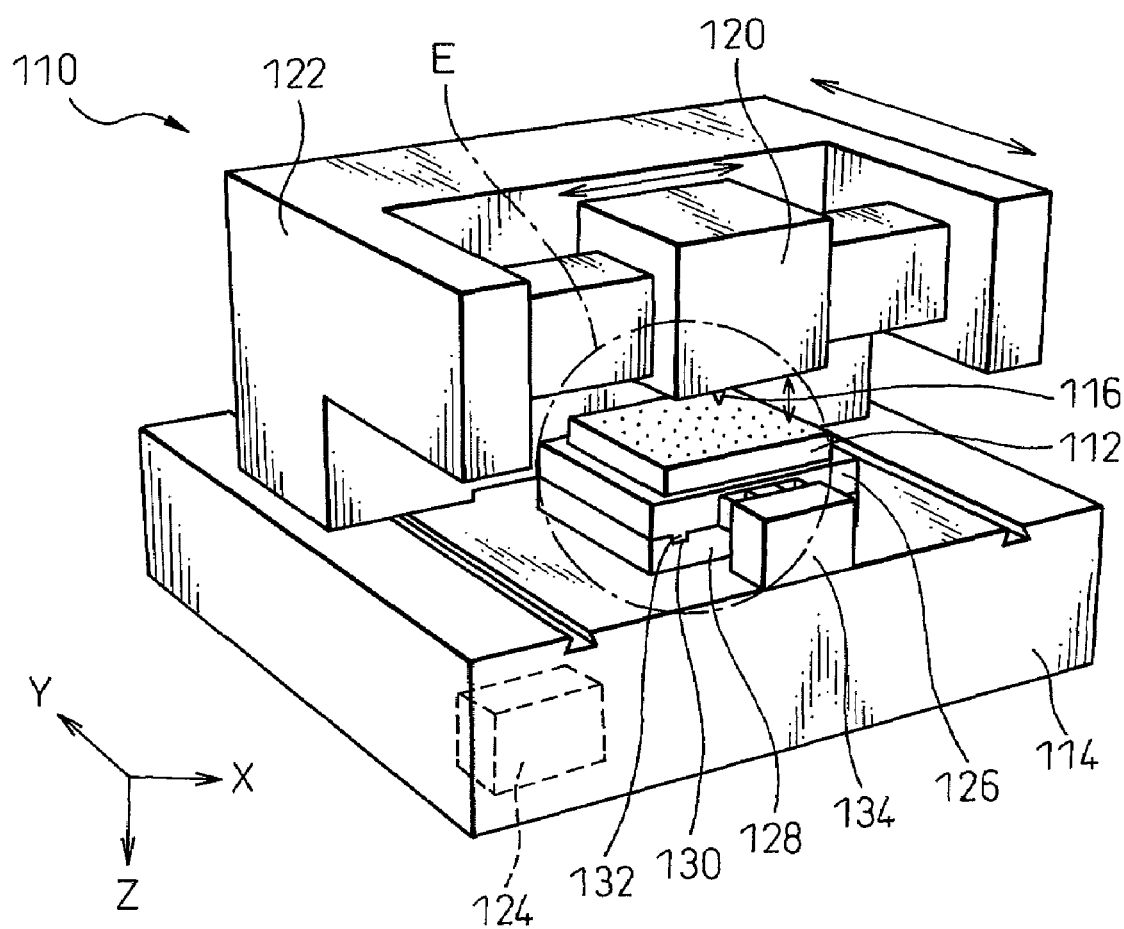
FIG. 16 shows a schematic configuration of a machining apparatus of a second embodiment according to the invention.

FIG. 16 shows a schematic configuration of a machining apparatus 110 of a second embodiment according to the invention. In the apparatus 110, like reference numerals in the series 100 are used to indicate parts corresponding to the apparatus 10 of the first embodiment. The second embodiment is different from the first embodiment in that the apparatus 110 includes a device for generating the microdisplacement of a workpiece 112 in the Y-direction.

As shown in FIG. 16, the machining apparatus 110 includes a first block 126 on which the workpiece 112 is loaded, and a second block 128 fixed to a base 114 and slidably engaged with the first block 126. The second block 128 has a groove 130 extending in the Y-direction and the first block 126 has a protrusion 132 fitting into the groove 130.

Figure 17A:
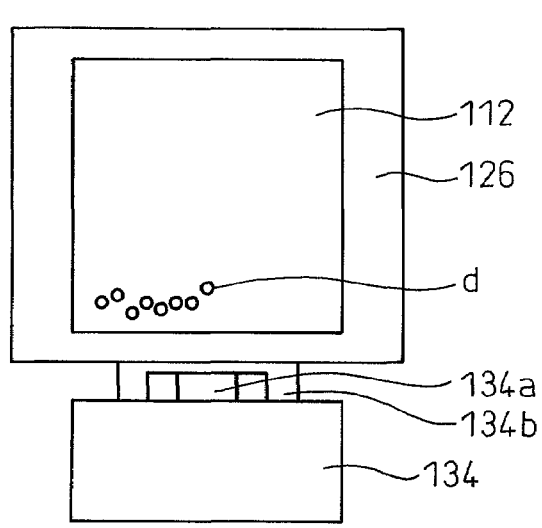
FIG. 17a is an enlarged view of the "E" portion of FIG. 16, showing the state that the workpiece is not displaced relative to the tool by means of a piezoelectric element.
Figure 17B:
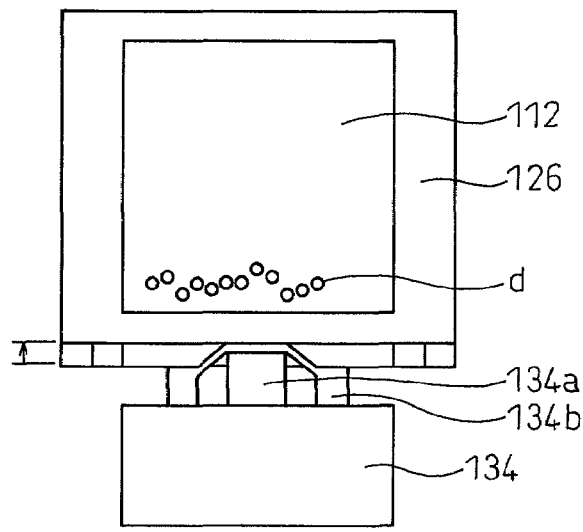
FIG. 17b shows the state that the workpiece is displaced relative to the tool by means of a piezoelectric element.

The machining apparatus 110 includes, as shown in FIGS. 17a and 17b, a fourth linear moving part 134 capable of generating the microdisplacement of the first block 126 in the Y-direction. The preferable example of the fourth moving part 134 has, similar to the first linear moving part 18 of the apparatus 10, a piezoelectric element 134a attached to the first block 126 and configured to be expanded or contracted in the Y-direction, and an elastic member 134b, such as a plate spring, for biasing the first block 126 toward the initial position thereof.

Figure 18:
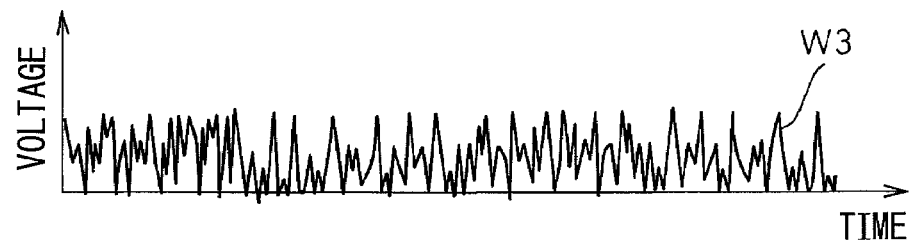
FIG. 18 is a graph showing an example of a voltage waveform applied to the piezoelectric element.

FIG. 18 shows a third waveform W3 which is an example of a voltage waveform applied to the piezoelectric element 134a. The voltage waveform W3 is a waveform, such as white noise, at least one of frequency and amplitude of which is irregular. In general, the piezoelectric element is displaced (expanded or contracted) proportional to the magnitude of voltage applied to the piezoelectric element. Therefore, when voltage, having an irregular waveform as shown in FIG. 18, is applied to the piezoelectric element 134a during one span, the piezoelectric element 134a is irregularly displaced in the Y-direction by the distance proportional to the magnitude of the applied voltage. According to the displacement of the piezoelectric element 134a, the first block 126 and the workpiece 112 are also displaced in the Y-direction. Therefore, the dimples may be irregularly arranged on the workpiece 112 in the Y-direction, as well as the X-direction, whereby the degree of irregularity of the dimples may be further raised.

Figure 19:
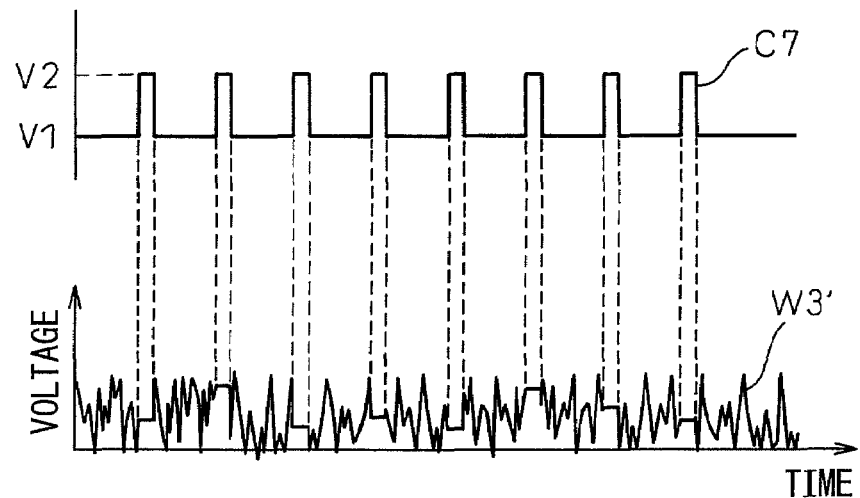
FIG. 19 is a graph showing an example of a voltage waveform applied to the piezoelectric element, modified such that the workpiece is not displaced in a Y-direction while the tool is cutting into the workpiece.

At this point, however, the first block 126 (or the workpiece 112) is displaced while the tool 116 is cutting into the workpiece 112, and the shape of each dimple may be distorted. Therefore, it is preferable that the first block 126 be stopped while the tool 116 is cutting into the workpiece 112. FIG. 19 shows a voltage waveform for achieving this object. An upper part of FIG. 19 shows a rectangular waveform C7 indicating whether the tool cuts into the workpiece or is away from the workpiece. Concretely, when the magnitude of the waveform C7 is equal to V1, the tool 116 is away from the workpiece. On the other hand, when the magnitude of the waveform C7 is equal to V2, the tool 116 cuts into the workpiece. In this case, as shown in a lower part of FIG. 19, a waveform W3' may be used, in which the magnitude of the voltage does not change while the magnitude of the waveform C7 is equal to V2. Due to this, the workpiece is not displaced in the Y-direction while the tool cutting into the workpiece. Accordingly, dimples, each having a uniform shape, may be irregularly arranged both in the X and Y-directions.

According to the machining apparatus of the present invention, a plurality of dimples may be irregularly arranged on the workpiece, without determining each coordinate of the dimples. Therefore, time required for forming each dimple may be greatly reduced, resulting in that time for machining the whole of workpiece may also be remarkably reduced.

By the configuration in which the tool may be moved relative to the workpiece in the third direction, the dimples may be irregularly arranged on the whole surface of the workpiece to be machined.

By using the white noise as the first waveform, having frequency and amplitude, at least one of which is irregular, may be easily obtained. In this case, by suitably changing a threshold, the area density of the formed dimples may be arbitrary varied. Concretely, the dimples may be arranged in high density or low density on the whole surface of the workpiece. Otherwise, some dimples may be arranged in high density on a part of one workpiece while other dimples may be arranged in low density on the other part of the same workpiece.

On the other hand, it is possible to use the periodic saw-tooth waveform on which the white noise is superposed, and compare the magnitude of the waveform with a certain threshold one time in each cycle of the waveform. Due to this, dimples may be irregularly arranged, while the total number of the dimples may be determined. In this case, the degree of irregularity of the dimples may be varied by merely changing the amplitude of the white noise superposed on the saw-tooth waveform.

The dimples may be irregularly arranged on the workpiece in the third direction, as well as the second direction, by generating microdisplacement of the workpiece in the third direction relative to the tool while the tool is moved in the second direction. In this case, in order to not distert the shape of each dimple, it is preferable that microdisplacement of the workpiece is not generated while the tool is cutting into the workpiece.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A machining apparatus comprising:
    a tool for machining a plurality of dimples on a surface of a workpiece, each dimple having a depth in a first direction;
    a drive unit for displacing the tool relative to the workpiece in the first direction and a second direction generally perpendicular to the first direction;
    a controller for controlling the drive unit so as to displace the tool relative to the workpiece in the first direction such that the tool cuts into or leaves the workpiece, while the tool is being moved relative to the workpiece in the second direction, wherein the timing of a trigger of the displacement of the tool relative to the workpiece in the first direction is calculated by using a second waveform, the second waveform being determined by comparing the magnitude of a first waveform with a predetermined threshold, at least one of frequency and amplitude of the first waveform being irregular.

2. The machining apparatus as set forth in claim 1, wherein the drive unit is configured to move the tool relative to the workpiece in a third direction generally perpendicular to both the first and second directions.

3. The machining apparatus as set forth in claim 1, wherein the first waveform is a white noise waveform and the trigger is timed corresponding to at least one of a rising edge and a trailing edge of the second waveform.

4. The machining apparatus as set forth in claim 3, wherein the area density of the plurality of dimples formed on the workpiece is varied by changing the predetermined threshold.

5. The machining apparatus as set forth in claim 1, wherein the first waveform is configured by superposing a white noise waveform on a periodic waveform and the trigger is timed when the magnitude correlation between the predetermined threshold and magnitude of the first waveform is reversed in each period of the periodic waveform.

6. The machining apparatus as set forth in claim 5, wherein the periodic waveform is a saw-tooth waveform.

7. The machining apparatus as set forth in claim 5, wherein the degree of irregularity of the positions of the plurality of dimples formed on the workpiece is varied by changing the amplitude of the white noise waveform.

8. The machining apparatus as set forth in claim 1, wherein the drive unit has a piezoelectric element for displacing the tool relative to the workpiece in the first direction.

9. The machining apparatus as set forth in claim 2, wherein the drive unit is configured to generate microdisplacement of the workpiece relative to the tool in the third direction, while the tool is being moved relative to the workpiece in the second direction, the amount of microdisplacement of the workpiece in the third direction being proportional to the magnitude of a third waveform, at least one of frequency and amplitude of the third waveform being irregular.

10. The machining apparatus as set forth in claim 9, wherein the drive unit is configured not to generate microdisplacement of the workpiece relative to the tool in the third direction, while the tool is cutting into the workpiece.

11. The machining apparatus as set forth in claim 9, wherein the third waveform is a white noise waveform.

12. The machining apparatus as set forth in claim 9, wherein the drive unit has a piezoelectric element for displacing the workpiece relative to the tool in the third direction, the piezoelectric element being activated by means of voltage having the third waveform applied to the piezoelectric element.

* * * * *